UNITED STATES PATENT OFFICE.

HENRY ANDREW KENT, OF BOUND'S GREEN, AND HAROLD GEORGE LACELL, OF FINCHLEY, ENGLAND, ASSIGNORS TO SILICA SYNDICATE LIMITED, OF LONDON, ENGLAND.

SILICA-GLASS ELECTRIC APPLIANCE.

1,054,647.     Specification of Letters Patent.     Patented Feb. 25, 1913.

No Drawing.     Application filed November 21, 1912. Serial No. 732,697.

*To all whom it may concern:*

Be it known that we, HENRY ANDREW KENT, a subject of the King of Great Britain and Ireland, of The Poplars, Maidstone Road, Bound's Green, in the county of Middlesex, England, and HAROLD GEORGE LACELL, a subject of the King of Great Britain and Ireland, of Ardoch, Nether street, Finchley, in the county of Middlesex, England, have invented new and useful Improvements in Silica-Glass Electric Appliances, of which the following is a specification.

It has been proposed to employ leading-in wires of either molybdenum or tungsten for evacuated electrical devices with which it was customary to employ platinum leading-in wires.

The object of this invention is to overcome difficulties which have been experienced in combining leading-in wires with articles made of silica glass.

It is to be noted that the present invention does not relate to devices made of glass with which it has been customary to employ platinum leading-in wires but solely to devices made of silica glass, to which latter platinum leading-in wires have not been applied because the fusing point of silica glass is so high that platinum would be fused at the temperature at which silica glass fuses. It is necessary in sealing wires into silica glass not only that the leading-in wires shall be capable of withstanding the high temperature employed in manufacturing articles of silica glass, but also that the leading-in wires shall be of very small cross section in order to obviate, or minimize, the leakage of air, at the joint, or junction of the leading-in wires with the silica glass which might be caused by contraction of the metal on cooling. Tungsten is not suitable for use for leading-in wires for silica glass articles as the electric conductivity of tungsten is so low as to require wires of too great a diameter.

After numerous trials and experiments the present inventors have found that, as far as they have been able to ascertain molybdenum is the only metal which fulfils the requisite conditions as a very small sectional area of that metal will carry a large current while the said metal will withstand the high temperature employed in manufacturing articles of silica glass. It is necessary that the molybdemum while being applied should, as far as possible, be protected from oxidation and for that purpose the molybdenum wire of small cross section should be inserted in a small orifice in the silica glass so that but a very small amount of air can come in contact with the metal while the heated silica glass is closed around it, or the operation of embedding the molybdenum wire in the silica glass is carried on in a vacuum, or in a non-oxidizing atmosphere. The joint between the molybdenum and the silica glass can be made so that it will constitute a complete seal against the passage of mercury, or other liquid, although it is not essential that it should be absolutely proof against passage of air.

We do not claim the use of molybdenum leading-in wires for articles of glass for which it has been customary to use platinum leading-in wires.

What we claim is:—

An electric appliance of the character described provided with a molybdenum leading-in wire sealed in silica glass.

In testimony whereof we have signed our names to this specification in the presence of two subscribing witnesses.

HENRY ANDREW KENT.
    HAROLD GEORGE LACELL.

Witnesses:
    WILLIAM GERALD REYNOLDS,
    EDWIN VIVIAN SMITH.